(12) United States Patent
Kurras et al.

(10) Patent No.: US 11,201,765 B2
(45) Date of Patent: Dec. 14, 2021

(54) RECEIVER, TRANSMITTER, WIRELESS COMMUNICATION NETWORK AND METHOD TO COMMUNICATE A NON-PULSE SHAPED SIGNAL IN A MULTI CARRIER PULSE SHAPED TRANSMISSION SYSTEM

(71) Applicant: Fraunhofer-Gesellschaft zur Foerderung der angewandten Forschung e.V., Munich (DE)

(72) Inventors: Martin Kurras, Berlin (DE); Thomas Haustein, Potsdam (DE); Lars Thiele, Berlin (DE); Rohit Datta, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 41 days.

(21) Appl. No.: 16/423,830

(22) Filed: May 28, 2019

(65) Prior Publication Data

US 2019/0280900 A1    Sep. 12, 2019

Related U.S. Application Data

(63) Continuation of application No. PCT/EP2017/080639, filed on Nov. 28, 2017.

(30) Foreign Application Priority Data

Nov. 29, 2016  (EP) .................................. 16201216

(51) Int. Cl.
*H04L 5/12* (2006.01)
*H04L 25/02* (2006.01)
(Continued)

(52) U.S. Cl.
CPC ....... *H04L 25/0226* (2013.01); *H04B 7/0417* (2013.01); *H04B 17/24* (2015.01);
(Continued)

(58) Field of Classification Search
CPC .............. H04L 25/0226; H04L 5/0007; H04L 27/2613; H04L 27/264; H04B 17/24; H04B 17/336; H04B 7/0417
(Continued)

(56) References Cited

U.S. PATENT DOCUMENTS

2011/0026637 A1* 2/2011 Lee ...................... H04L 5/0048
375/295
2011/0044377 A1 2/2011 Ibi et al.
(Continued)

OTHER PUBLICATIONS

Chen, Tao et al., "A Novel Frequency-Domain Channel Parameters Estimation Method by Time-Domain Pilots Inserting for OFDM Systems", Wireless Pervasive Computing, 2009. ISWPC 2009. 4th International Symposium on, IEEE, Piscataway, NJ, USA XP031436685, Feb. 11, 2009, pp. 1-5.
(Continued)

*Primary Examiner* — Zewdu A Kassa
(74) *Attorney, Agent, or Firm* — Michael A. Glenn; Perkins Coie LLP (57) ABSTRACT

A receiver has an antenna to receive a pulse shaped transmit signal transmitted by a transmitter of a multi carrier (MC) pulse shaped transmission system. The pulse shaped transmit signal includes a predefined signal pattern. The predefined signal pattern is not subjected to pulse shaping. The receiver includes a filter to pulse shape filter the pulse shaped transmit signal to obtain data for the receiver. The predefined signal pattern is retrieved from the pulse shaped transmit signal prior to filtering the pulse shaped transmit signal.

11 Claims, 5 Drawing Sheets

(51) Int. Cl.
  *H04B 17/24*      (2015.01)
  *H04B 17/336*     (2015.01)
  *H04B 7/0417*     (2017.01)
  *H04L 5/00*       (2006.01)
  *H04L 27/26*      (2006.01)

(52) U.S. Cl.
  CPC ......... *H04B 17/336* (2015.01); *H04L 5/0007* (2013.01); *H04L 27/264* (2013.01); *H04L 27/2613* (2013.01)

(58) Field of Classification Search
  USPC .................... 375/362, 354, 316, 295, 219
  See application file for complete search history.

(56) References Cited

U.S. PATENT DOCUMENTS

| | | | | |
|---|---|---|---|---|
| 2012/0257688 | A1* | 10/2012 | Murakami | H04L 5/0048 375/295 |
| 2014/0363173 | A1* | 12/2014 | Dave | H04L 7/0075 398/149 |
| 2015/0139356 | A1* | 5/2015 | Song | H04L 27/2627 375/296 |

OTHER PUBLICATIONS

Dai, Linglong et al., "Spectrum-Efficient Coherent Optical OFDM for Transport Networks", IEEE Journal on Selected Areas in Communications, IEEE Service Center, Piscataway, US, vol. 31, No. 1, XP011481801, Jan. 1, 2013, pp. 62-74.

* cited by examiner

RECEIVER, TRANSMITTER, WIRELESS COMMUNICATION NETWORK AND METHOD TO COMMUNICATE A NON-PULSE SHAPED SIGNAL IN A MULTI CARRIER PULSE SHAPED TRANSMISSION SYSTEM

CROSS-REFERENCE TO RELATED APPLICATIONS

This application is a continuation of copending International Application No. PCT/EP2017/080639, filed Nov. 28, 2017, which is incorporated herein by reference in its entirety, and additionally claims priority from European Application No. 16201216.5, filed Nov. 29, 2016, which is also incorporated herein by reference in its entirety.

BACKGROUND OF THE INVENTION

The present invention concerns the field of wireless communication networks or systems, more specifically multicarrier pulse-shaped transmission systems. Examples of the invention concern the transmission of a non-pulse-shaped signal including information or data for a receiver in such a system. Specific examples concern an approach for an improved MIMO (MIMO=multiple input, multiple output) channel estimation when using pulse-shaped waveforms in a radio communication network.

Figure 1:
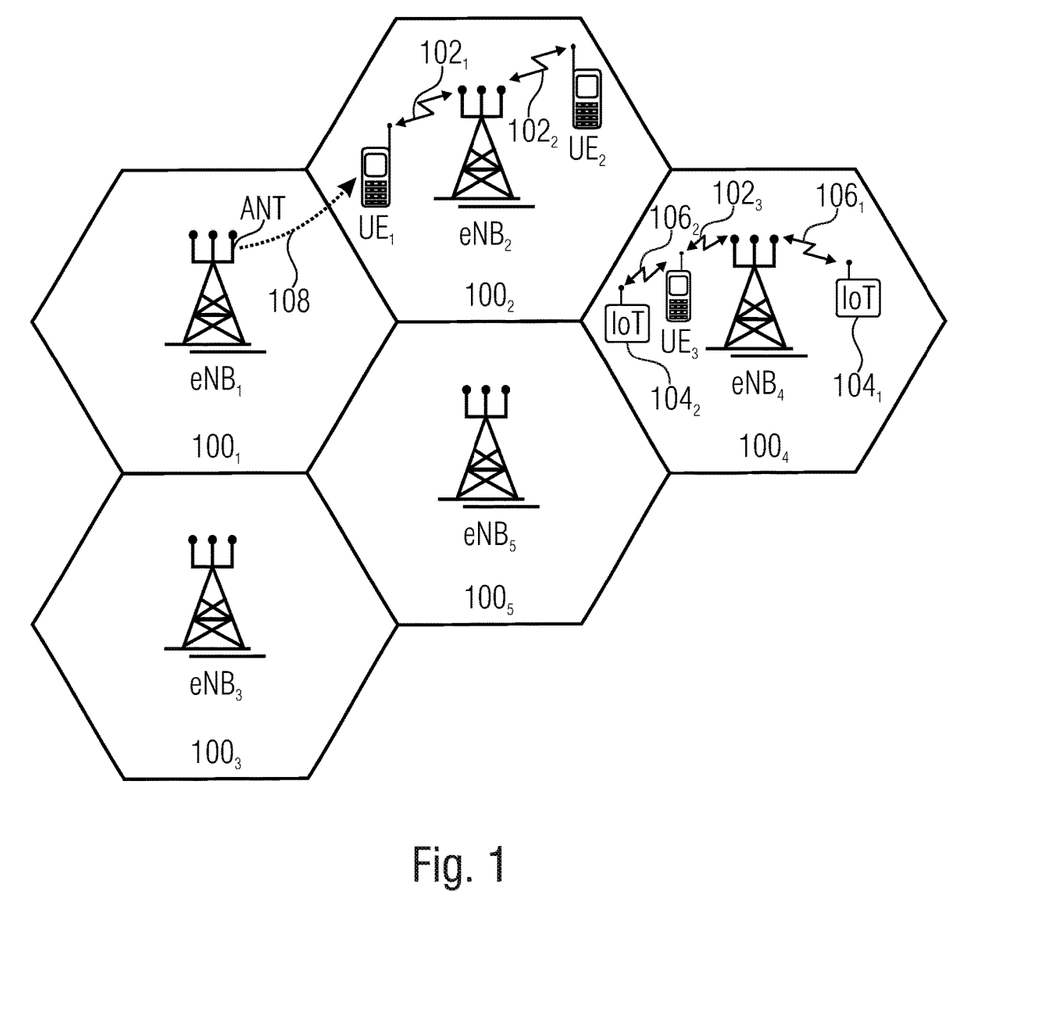
FIG. 1 shows a schematic representation of an example of a wireless communication system.

FIG. 1 is a schematic representation of an example of a network infrastructure, such as a wireless communication network or wireless communication system, including a plurality of base stations $eNB_1$ to $eNB_5$, each serving a specific area surrounding the base station schematically represented by the respective cells $100_1$ to $100_5$. The base stations are provided to serve users within a cell. A user may be a stationary device or a mobile device. Further, the wireless communication system may be accessed by IoT devices which connect to a base station or to a user. IoT devices may include physical devices, vehicles, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users UE1 and UE2, also referred to as user equipment (UE), that are in cell $100_2$ and that are served by base station $eNB_2$. Another user $UE_3$ is shown in cell $100_4$ which is served by base station $eNB_4$. The arrows $102_1$, $102_2$ and $102_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $104_1$ and $104_2$ in cell $100_4$, which may be stationary or mobile devices. The IoT device $104_1$ accesses the wireless communication system via the base station $eNB_4$ to receive and transmit data as schematically represented by arrow $106_1$. The IoT device $104_2$ accesses the wireless communication system via the user $UE_3$ as is schematically represented by arrow $106_2$.

The wireless communication system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-s-OFDM. Other waveforms, like non-orthogonal waveforms for multiple access, e.g. filterbank multicarrier (FBMC), may be used.

In a wireless communication network, as it is for example depicted in FIG. 1, an accurate estimation of spatial signatures of a multi-antenna system, like a MIMO system or a multi-user MIMO system, may be desired for an uplink (UL) and/or a downlink (DL) communication. The accurate estimation of the channel parameters is used for a signal separation in space between the signals transmitted at the same time-frequency resource of the communication system, so as to either increase the spectral efficiency or to suppress interfering signals coming from other transmitters within the receivers' reception range, for example interfering signals 108 indicated in FIG. 1 schematically by the dashed arrow from $eNB_1$ towards $UE_1$. Spatial signal processing is a rather simple task in systems using waveforms that are well-defined within the time/frequency domain, as it is the case for OFDM waveforms having a cyclic prefix. However, in situations in which the waveform for transmitting the information is not as well-defined in the time/frequency domain and is transmitted interleaved through the radio propagation channel, the spatial signal processing becomes increasingly challenging. For example, when considering waveforms like a FBMC (filterbank multicarrier) waveform, a GFDM (generalized frequency division multiplexing) waveform or other non-orthogonal waveforms such spatial signal processing may be challenging when compared to OFDM approaches. The above-mentioned non-orthogonal waveforms may be utilized in a mobile communication network defined in accordance with the 5G standard and other scenarios beyond mobile broadband approaches, like in meshed car2car (V2X) communication systems.

For example, in situations in which a plurality of antenna elements is provided at the transmitter and/or at the receiver, which is also referred to as a massive MIMO (M-MIMO) system, an advanced spatial signal processing is desired which, for closely spaced antennas, allows for a directive beamforming and, thereby, for a spatial separation of users by an accurate direction of arrival (DoA) estimation and direction of departure (DoD) estimation.

Usually, a spatial or MIMO signal processing may be combined with a narrowband (single carrier MIMO) waveform or a wideband waveform, like CDMA or OFDM as a multicarrier waveform. To estimate the channel coefficients of the MIMO matrix correctly in the time-frequency grid, reference symbols (RS) are embedded into the transmitted data stream which allow the estimation of amplitude and phase. In the case of OFDM, the transmitted signal is localized in a time-frequency grid such that consecutive OFDM symbols are well-isolated by inserting a guard interval, like a cyclic extension, between them, which is at least of the length of the channel impulse response in the time domain. In the frequency domain, adjacent subcarriers modulated with data are kept orthogonal to each other by Fourier Transforms and cyclic extensions. By embedding the known reference signal into the time/frequency grid the overall channel transfer function between antennas may be estimated. However, other than orthogonal waveforms, like OFDM approaches, non-orthogonal waveforms, like FBMC, may create signal separation problems between different antenna ports transmitting at the same time and frequency resource due to an inter-symbol-interference (ISI).

Thus, in scenarios in which non-orthogonal waveforms are used for transmitting information in the system, a substantial degradation in MIMO channel estimation may be observed which, at present, prohibits MIMO processing in such non-orthogonal waveform systems. Rather MIMO processing is limited to CDMA, single carrier and OFDM. More generally, when using non-orthogonal waveforms for communicating data, for example in accordance with the LTE standard, it may be difficult to derive from the data transmitted using the non-orthogonal waveforms, at the receiver, one or more desired data elements due to the above-mentioned drawbacks of non-orthogonal waveform systems, i.e., it may be difficult, at the receiver, to derive from the pulse-shaped filter the information of interest in a reliable way at the receiver.

It is an object of the present invention to provide an improved approach for transmitting data in a wireless communication system using non-orthogonal waveform allowing for a reliable detection of specific data at the receiver side.

SUMMARY

According to an embodiment, a receiver may have: an antenna configured to receive a pulse shaped transmit signal transmitted by a transmitter of a multi carrier pulse shaped transmission system, wherein the pulse shaped transmit signal includes a predefined signal pattern, the predefined signal pattern not subjected to pulse shaping; and a filter configured to pulse shape filter the pulse shaped transmit signal to obtain data for the receiver; wherein the receiver is configured to retrieve the predefined signal pattern from the pulse shaped transmit signal prior to filtering the pulse shaped transmit signal.

According to another embodiment, a transmitter may have: a pulse shaping filter configured to pulse shape filter a data block to generate a transmit signal including data to be transmitted to a receiver of a multi carrier pulse shaped transmission system; and an inverse pulse shaping filter configured to inverse pulse shape filter a predefined signal pattern, wherein the transmitter is configured to include the inverse filtered signal pattern into the data block prior to applying the data block to the pulse shaping filter.

According to another embodiment, a wireless communication network may have: an inventive receiver as mentioned above; and an inventive transmitter as mentioned above.

According to still another embodiment, a method may have the steps of: receiving, at a receiver of a multi carrier pulse shaped transmission system, a pulse shaped transmit signal transmitted by a transmitter of the multi carrier pulse shaped transmission system, wherein the pulse shaped transmit signal includes a predefined signal pattern, the predefined signal pattern not subjected to pulse shaping; and retrieving the predefined signal pattern from the pulse shaped transmit signal; and following the retrieval of predefined signal pattern from the pulse shaped transmit signal, pulse shape filtering the pulse shaped transmit signal to obtain data for the receiver.

According to another embodiment, a method may have the steps of: providing, by a transmitter of a multi carrier pulse shaped transmission system, a data block to be transmitted to a receiver of the multi carrier pulse shaped transmission system; wherein providing the data block has: pulse shape filtering the data block to generate the transmit signal including data to be transmitted to the receiver of the multi carrier pulse shaped transmission system; and inverse pulse shaping filtering a predefined signal pattern, and including the inverse filtered signal pattern into the data block prior to pulse shaping filtering the data block.

According to another embodiment, a method may have the steps of: providing, by a transmitter of a multi carrier pulse shaped transmission system, a data block to be transmitted to a receiver of the multi carrier pulse shaped transmission system, wherein providing the data block has: pulse shape filtering the data block to generate a pulse shaped transmit signal including data to be transmitted to the receiver of the multi carrier pulse shaped transmission system, and inverse pulse shaping filtering a predefined signal pattern, and including the inverse filtered signal pattern into the data block prior to pulse shaping filtering the data block; transmitting the pulse shaped transmit signal from the transmitter to a receiver of the multi carrier pulse shaped transmission system; retrieving, at the receiver, the predefined signal pattern from the pulse shaped transmit signal; and following the retrieval of predefined signal pattern from the pulse shaped transmit signal, pulse shape filtering the pulse shaped transmit signal to obtain data for the receiver.

Another embodiment may have a non-transitory digital storage medium having stored thereon a computer program for performing any of the above inventive methods, when said computer program is run by a computer.

BRIEF DESCRIPTION OF THE DRAWINGS

Embodiments of the present invention will be described in further detail with reference to the accompanying drawings, in which.

DETAILED DESCRIPTION OF THE INVENTION

In the following, embodiments of the present invention are described in further detail with reference to the enclosed drawings in which elements having the same or similar function are referenced by the same reference signs.

Figure 2:
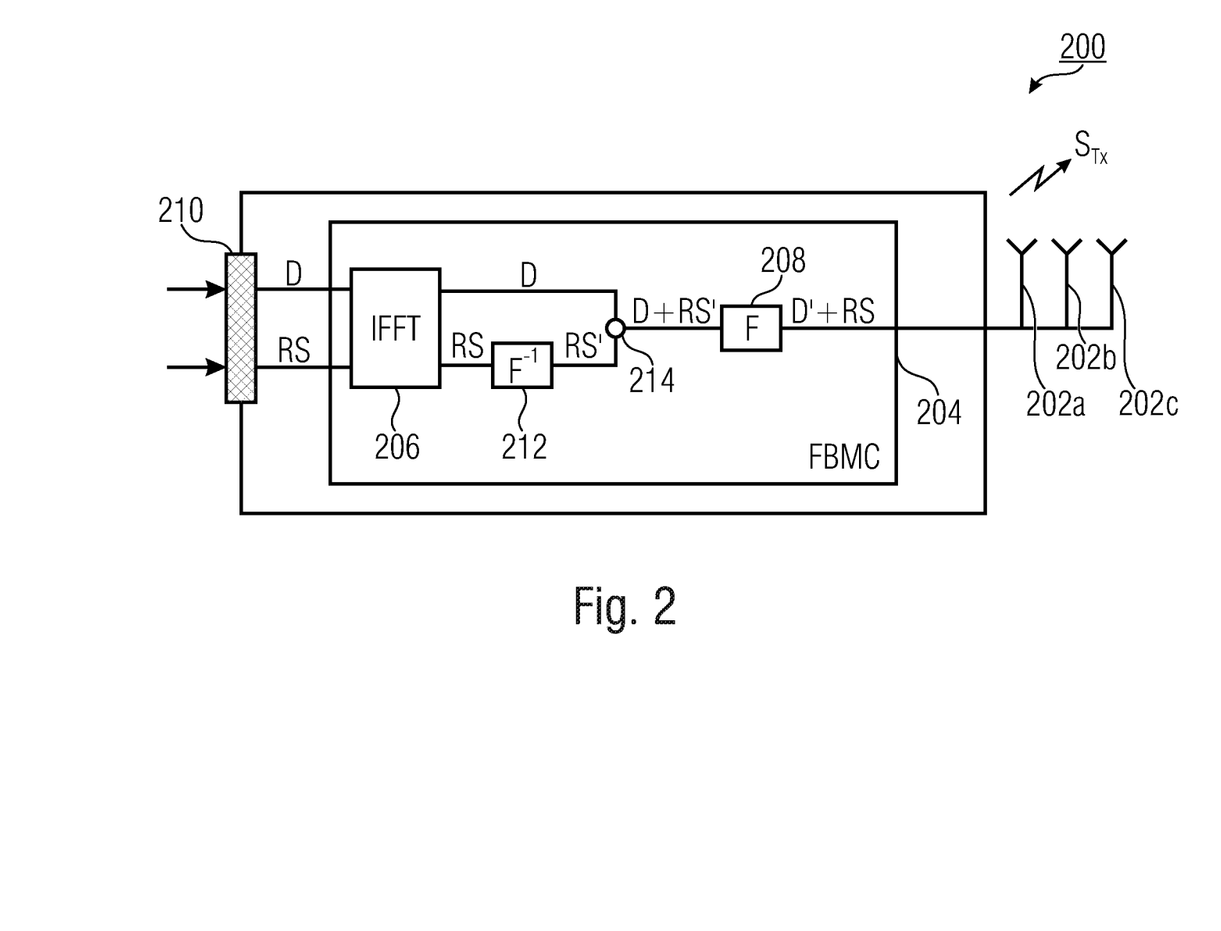
FIG. 2 shows an example of a transmitter operating in accordance with the principles of the present invention described herein.

FIG. 2 shows an example of a transmitter operating in accordance with the principles of the present invention described herein. The transmitter 200 includes one or more antennas 202a to 202c provided to transmit a transmit signal $S_{Tx}$ generated by the transmitter 200 within a communication system, as it is for example shown in FIG. 1, towards a receiver located within the system. The transmitter 200 includes a non-orthogonal waveform processing block 204 receiving data D. The data D is applied to the Inverse Fast Fourier Transformation block 206, the output of which is applied to a plurality of filters or to a filterbank 208 so a pulse-shaped data signal D' is generated. The data D is received at an input 210 of the transmitter. In accordance with examples of the present invention, the input 210 may also receive a predefined signal pattern or signal, like a reference signal as it is used in accordance with the LTE standard, which usually is transmitted as part of the data D. However, as mentioned above, using non-orthogonal waveforms generated by the block 204, like an FBMC block, a GFDM block or any other non-orthogonal system block, make it difficult or impossible to reliably detect the signal RS after transmission from the transmit signal $S_{Tx}$. To address this problem, the inventive approach teaches to perform a preprocessing of the signal pattern RS prior to generating the pulse-shaped transmit signal $S_{Tx}$, which may also be referred to as a "precoding". The non-orthogonal waveform approach may use the filters/filterbank 208 to pulse-shape the signal, and in accordance with the present invention, prior to applying the signal to be transmitted to the block 204, the specific signal pattern RS is applied to an inverse filter 212 so as to provide an inverse filtered signal RS' that is combined with the data signal D and applied to the block 204. Due to the filtering at block 208, the original non-pulse-shaped signal RS appears again in the transmit signal $S_{Tx}$. Thus, in the non-processed signal received at a receiver the original signal pattern RS which has not been subjected to any pulse-shaping, can be easily identified and used for further processing at the receiver side.

For example, the predefined signal pattern RS may be a reference signal as it is used, for example in accordance with the LTE standard, for performing a channel estimation, a MIMO estimation or a DoD estimation at the receiver. This allows for a combination of MIMO and M-MIMO processing together with using non-orthogonal waveforms for the signal transmission because an accurate channel parameter estimation is possible due to the inventive transmission scheme even under ISI constraints as they are experienced when transmitting using non-orthogonal waveforms. In accordance with an example, a compatible Rel 8-13 RS pattern may be chosen as the predefined signal pattern RS which is then convolved with the matched filter 212 of the transmission scheme. For example, in FBMC, the RS pattern may be convolved with a truncated RRC (root raised cosine) pulse, which is also used at the receiver side. Then, the convolved pattern RS' is inserted into the transmit data block D, as indicated at 214 in FIG. 2, together with the additional data to be transmitted. Following this precoding or preprocessing of the signal RS, the regular transmit processing in accordance with the FBMC approach, for example pulse-shaping using the transmit filterbank 208 and an up-conversion, is carried out. The transmit filters 208 may convolve subcarrier-wise with the Rx filter convolved RS patterns, thereby removing from the inverse-filtered RS' the effects of the filtering, and the transmit filters pulse-shape the remaining parts of the data D, yielding the pulse-shaping data block D'. The final transmit signal $S_{Tx}$ includes the original pattern RS, however, the data D is now pulse-shaped according to the FBMC transmission scheme. Alternatively, instead of the FBMC transmission scheme, the GFDM transmission scheme or any other OFDM-based pulse-shaped transmission scheme may be applied so as to incorporate the RS pattern in accordance with Rel 8-13 into the non-orthogonal waveform transmission schemes.

In the following, a specific example of the inventive approach will be described in the context of pilot symbols as used in traditional or legacy LTE devices which are to be transmitted using non-orthogonal waveforms in a way that still allows for a reliable channel estimation/MIMO estimation at the receiver side. In accordance with this example it is assumed that the transmit signal is generated using FBMC which applies an appropriate filtering such that a desired time-frequency localization is achieved. The pilot symbols RS are subjected to an inverse filtering, which may also be referred to as a kind of "precoding", so that after applying the waveform filtering of the FBMC approach, the RS will appear again in the transmit signal as they would appear in a narrowband or OFDM system. The pilot signals are easily identified in the signal received at the receiver prior to performing any signal processing for obtaining the data so that the pilot symbols, which have been transmitted in this way, allow for the extraction of MIMO channel parameters for a spatial signature separation at the receiver side without suffering from any ISI that is caused by the transmit filtering due to the FBMC transmission scheme, for example by filter 208 in FIG. 2.

In accordance with embodiments, the precoded pilot signals may be boosted such that they are transmitted with a greater signal strength when compared to the remaining elements in the data block. Such boosting may be performed adaptively in an open loop or in a closed loop during an acquisition/training and tracking phase. For example, the increased signal strength may be obtained by providing additional pilot symbols. For example, a 10% RS overload, which results in a 3 dB data payload power reduction, results in a 10 dB RS boosting which, in accordance with the examples, allows the RS boosting to be controlled user-specifically.

In accordance with further examples, the data block D may also include further pilot signals that are not subjected to the precoding or preprocessing by the inverse filtering so that the data block, in addition to the precoded pilot signals, which may boosted signals, also includes conventional pilot signals as they may be defined by the LTE standard following the Rel. 8-12 and Rel. 8-13 specifications. Once the data block D has been formed to include the two types of pilot symbols, it is sent to the synthesis filter 208 of the FBMC system 204, or to the pulse-shaping filter of an OFDM-based non-orthogonal system, and the inverse filter boosted pilots are filtered with their matched filter coefficients by the filter 208 and hence take the form of the original, conventional format. The rest of the data block D is pulse-shaped subcarrier-wise according to the chosen non-orthogonal transmit system yielding the pulse-shaped data block D'. In scenarios, in which the transmitter 200 includes a large amount of transmit antennas, these additional placed reference signals RS may be reused within the same cell due to the spatial separation, if a precoded RS may be assumed. This also allows introducing non-legacy LTE RS to be used.

Figure 3:
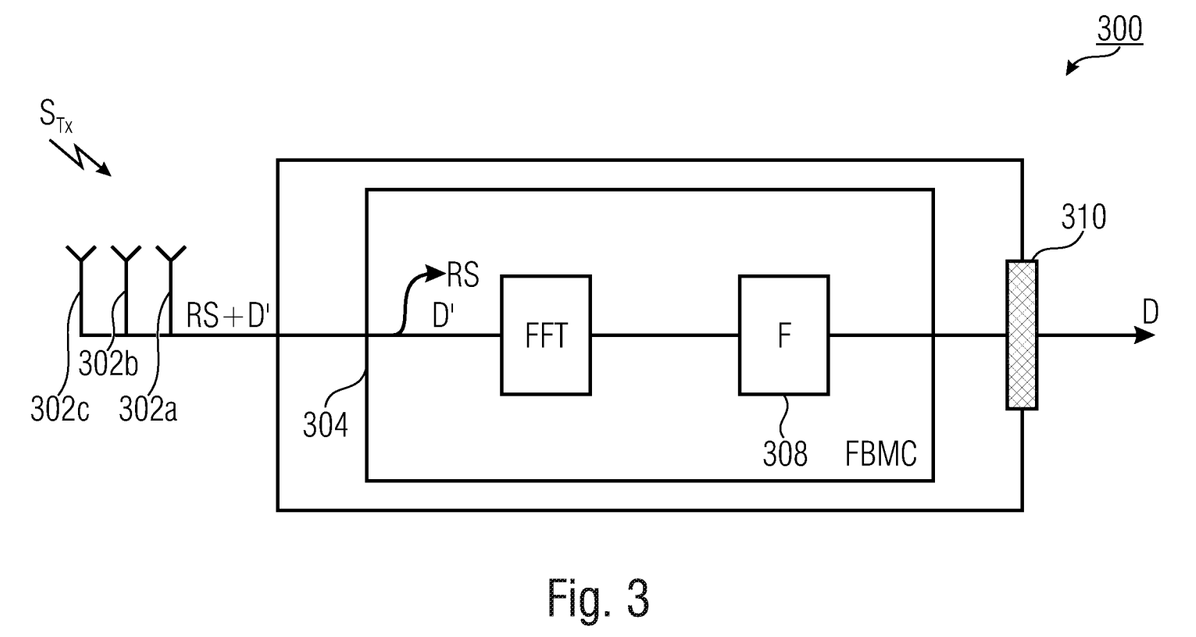
FIG. 3 shows a schematic block diagram of a receiver operating in accordance with an example of the inventive approach.

FIG. 3 shows a schematic block diagram of a receiver 300 operating in accordance with the inventive approach. The receiver includes a plurality of receive antennas 302a to 302c to receive the transmit signal $S_{Tx}$ provided, for example, by a transmitter shown in FIG. 2. In the example of FIG. 3, the receiver includes an FBMC block 304 receiving the transmit signal $S_{Tx}$ including the non-pulse-shaped pattern RS and the pulse-shaped data D' which are applied to a Fast Fourier Transform Block 306, and from the signal $S_{Tx}$, the predefined pattern RS can be directly obtained. The rest of the pulse-shaped block D' is applied to the filter or analysis filterbank 308 so as to obtain the data D which may be output at an output 310 of the receiver 300. The signal RS directly obtained from the pulse-shaped transmit signal $S_{Tx}$ may be used for a channel estimation, a MIMO estimation or a DoD estimation at the receiver 300 which, to perform this function, includes additional circuitry that shall be described in further detail below. The receiver may determine the SINR of the channel transmitting the reference signal, and to transmit the SINR to the transmitter. In accordance with an example, the receiver 300 may process the signal $S_{Tx}$ by applying it to a low noise amplifier (LNA) and by performing an analog-to-digital conversion (ADC). Then the spectral filtering is applied, for example by applying a FFT operation for separating the received signal part in the frequency domain associated with the receiver or with a transmit antenna in the uplink and/or downlink. In accordance with examples, the signal RS may be transformed back into the time domain, and the pilot signals RS, for example the boosted pilot signals, may be easily identified in case of the FBMC transmission scheme, but also in case of a GFDM transmission scheme or any other OFDM-based pulse-shaped transmission scheme which allows for supporting a multi-user identification. For example, in case of an FBMC-OQAM, the interference is not existent because of the in-phase/quadrature subcarrier alternation.

In accordance with examples, as described above, the transmit signal may include the first non-pulse-shaped pilot signal as well as the second pilot signal included in the data block which is subjected to the pulse-shaped filtering. Following the analysis filterbank 308, based on these additional pilots inserted into the data block and subjected to pulse-shaping, a frame synchronization may be carried out, so that the two-stage RS synchronization is performed. The first stage uses the non-pulse-shaped RS signals, and the second stage uses the RS signals included in a conventional way in the data block, thereby supporting the separation of the spatial plane and the frequency plane. In accordance with examples, based on the received RS signals which have not been subjected to the pulse-shaping process, a MIMO channel coefficient or DoA estimation may be performed using those RS signals which are associated with the current receiver or with respective transmit antennas operating in a spectral window under investigation. The DoA estimation may be performed for a number of significant multi-path components (MPC) such that each MPC added improves the signal quality after an equalizer, and in line of sight (LoS) or non-line of sight (non-LoS) scenarios, five to ten dominant MPCs are used which come from strong single-bounce or multi-bounce scatterers.

In case the transmitter is equipped with a substantial amount of antennas, the transmitter may include a precoder to trigger only certain MPCs, so that the number of dominant MPCs per non-LoS link between the BS and the may be reduced. Following the estimation of the channel coefficients, suitable MIMO equalizer coefficients may be calculated to separate the signals.

Figure 4:
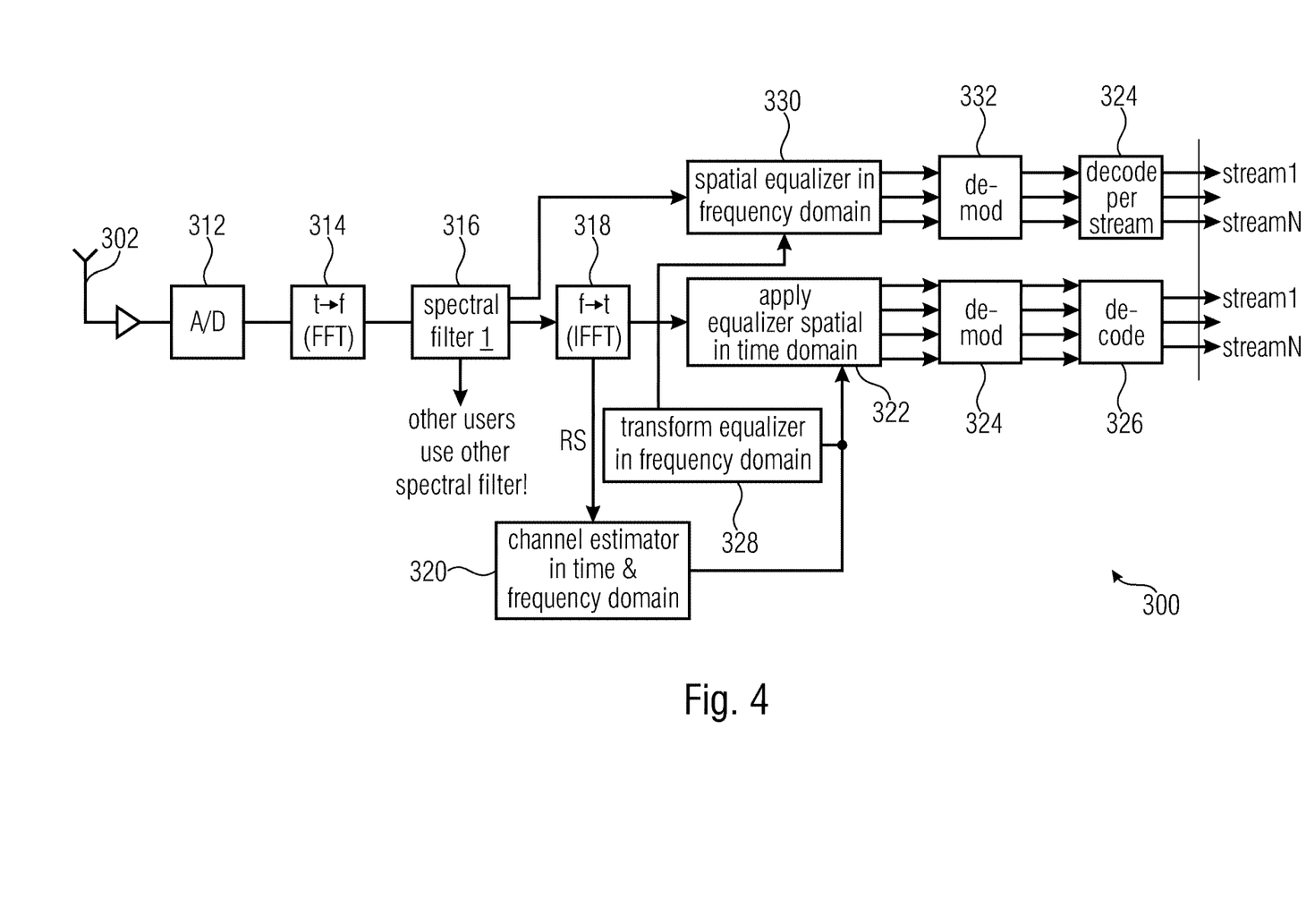
FIG. 4 shows a schematic block diagram of a receiver operating in accordance with another example of the inventive approach.

In the following an example of the inventive approach for using the non-pulse-shaped RS signals at the receiver side for a DoA estimation will be described with reference to FIG. 4 showing an example representation of a receiver chain. FIG. 4 shows a schematic block diagram of the receiver including the antenna 302. A transmit signal, as provided by the transmitter mentioned above, is received at the antenna 302 and applied to an A/D-converter 212 for transforming the signal from the analog domain into the digital domain. In accordance with the example of FIG. 4, the signal is transformed into the frequency domain by performing a FFT at 314, followed by a spectral filtering at 316 to remove from the received signals those spectral parts which belong to other users/receivers which use different spectral filters. The remaining spectral part after the filter 316 is transformed back into the time domain using an IFFT at 318, and the pilot signals RS are easily indicated without decoding the received signal, e.g., by applying it to an analysis filterbank. The pilot signals RS are supplied to a channel estimator 320, which estimates, on the basis of the pilot signals RS, the channel both in the time domain and/or the frequency domain. The channel estimates obtained by block 320 are supplied to an equalizer 322 in the time domain that is followed by a demodulator 324 including, for example, the analysis filterbank, and which is followed by a decoder 326 to obtain the respective data elements. The block 322-326 may operate on a subcarrier basis so as to output for each subcarrier the respective data stream. The channel estimates are also applied, following a transformation into the frequency domain at 328 to an equalizer in the frequency domain 330 which is followed, in a similar way as in the time domain, by a demodulator 332 and a decoder 334. In accordance with the inventive approach as described in the example of FIG. 4, the more complex receiver chain for the time domain is used to clean the subcarriers and to obtain the spatial equalizer in the frequency domain, and once the spatial equalizer 330 in the frequency domain is learned, the less complex branch with the direct spatial equalization in the frequency domain may be used.

Thus, in accordance with examples of the inventive approach, a MIMO channel estimation may be performed based on pilot signals prior to decoding the actual data signal, by inserting the pilot signals in the transmitted signal as described above. The pilot signals allow a sufficiently accurate channel coefficient estimation for a spatial signal separation with a MIMO equalizer in a scenario using for the signal transmission non-orthogonal waveforms. In accordance with examples, a large amount of transmit antennas may be provided so that the pilot symbol within the same cello may be reused, and the UE may feedback the quality parameters of the RS channel, like CQI/INR so that the base station may schedule the pilot symbol sequence in a precoded manner.

The forward and backward transform from the time domain into the frequency domain, as explained above with reference to FIG. 4, followed by the filtering and retransformation into the original space allows for the channel coefficients and/or DoA estimation to focus on a reduced number of transmit antennas or users in a particular frequency window, i.e. the received signal may be filtered at the BS with a spectral filter block to isolate desired user signals or antennas thereof in the frequency domain and equalization is done on the remaining components in the user-specific paths only.

In accordance with the present invention, the MIMO channel parameter and/or DoA estimation may be performed in the time and/or frequency domain depending on how many multi-path components are to be considered for the spatial signal processing. For example, multi-path components within a certain power window may only be considered with respect to the largest component. Further, the applied spatial filter per user allows a separation of multi-path components independent of the applied waveform.

Figure 5:
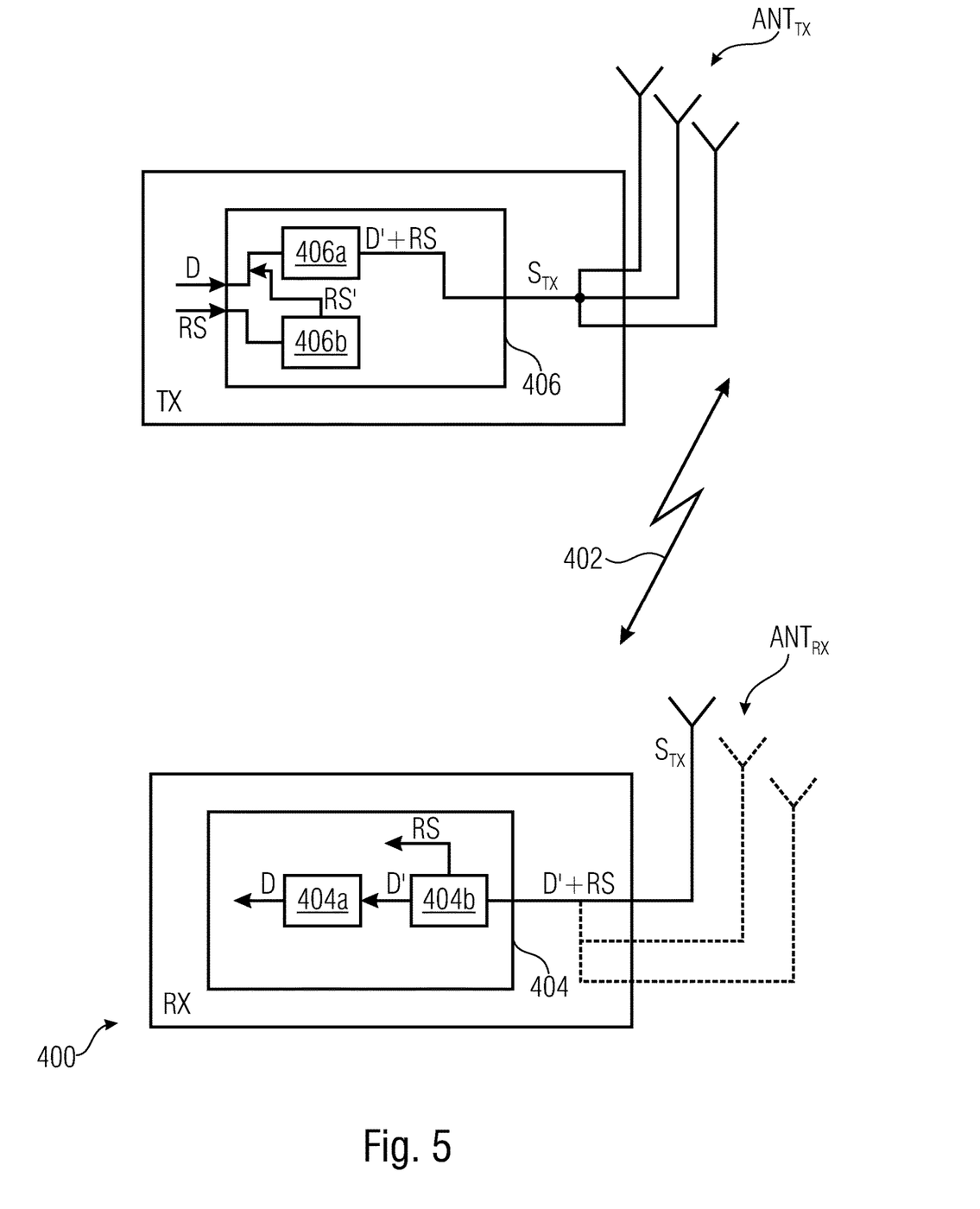
FIG. 5 is a schematic representation of a wireless communication system for transmitting information from a transmitter to a receiver.

Embodiments of the present invention may be implemented in a wireless communication system as depicted in FIG. 1 including base stations, users, like mobile terminals or IoT devices. FIG. 5 is a schematic representation of a wireless communication system 400 for communicating information between a transmitter TX and a receiver RX. The transmitter TX includes a plurality of antennas $ANT_{Tx}$ or an antenna array having a plurality of antenna elements. The receiver RX includes at least one antenna $ANT_{Rx}$. In other embodiments, the receiver RX may include more than one antenna. As is indicated by the arrow 402 signals are communicated between the transmitter TX and the receiver RX via a wireless communication link, like a radio link. The transmission may be in accordance with the one of the techniques described herein.

For example, the receiver RX receives via the one or more antennas $ANT_{Rx}$ a pulse shaped transmit signal $S_{Tx}$ from the transmitter TX. The pulse shaped transmit signal $S_{Tx}$ includes a predefined signal pattern RS not subjected to pulse shaping. The receiver RX includes a signal processor 404 having a filter 404a to pulse shape filter the transmit signal to obtain data D for the receiver. The receiver RX retrieves the predefined signal pattern RS from the pulse shaped transmit signal at 404b prior to filtering the pulse shaped transmit signal. The transmitter TX comprises a signal processor 406 including a pulse shaping filter 406a and an inverse pulse shaping filter 406b. The pulse shaping filter pulse 406a shape filters a data block D to generate the transmit signal $S_{Tx}$ including data D' to be transmitted to the receiver. The inverse pulse shaping filter 406b configured to inverse pulse shape filter a predefined signal pattern RS to obtain an inverse filtered signal pattern RS'. The inverse filtered signal pattern RS' is added to the data block D prior to applying the data block D to the pulse shaping filter 406a.

In accordance with examples, the receiver may be a legacy UE operating in accordance with a predefined standard, like the LTE standard. The legacy UE may operate in a first operation mode in the LTE standard on the basis of OFDM-based waveforms and in a second operation mode on the basis of other, non-OFDM based waveforms as described above. The legacy UE may receive a control signal, e.g. over the PDCCH, to switch from the first operation mode into the second operation mode. The control signaling may be performed in accordance with the LTE standard, e.g., by including the control information for switching into a DCI message.

The invention has been described above with reference to specific waveforms, like FBMC, GFDM and the like. However, it is noted that the invention is not limited to this, rather, any kind of OFDM-based waveform, filtered waveform or windowed waveform may be used.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Depending on certain implementation requirements, embodiments of the invention may be implemented in hardware or in software. The implementation may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A transmitter, comprising:
   a pulse shaping filter configured to pulse shape filter an Inverse Fast Fourier Transformation, IFFT, processed data block to generate a transmit signal comprising data to be transmitted to a receiver of a multi carrier pulse shaped transmission system; and
   an inverse pulse shaping filter configured to inverse pulse shape filter a predefined signal pattern,
   wherein the transmitter is configured to include the inverse filtered signal pattern into the IFFT processed data block prior to applying the IFFT processed data block to the pulse shaping filter so that after the pulse shaping filter the non-pulse-shaped signal pattern appears again in the transmit signal.

2. The transmitter of claim 1, comprising an antenna configured to transmit the transmit signal, wherein the predefined signal pattern is transmitted at a signal power that is higher than a signal power used to transmit other elements of the data block.

3. The transmitter of claim 1, wherein the predefined signal pattern represents a reference signal, the reference signal used at the receiver for at least one of a channel estimation, a MIMO estimation or a DoA estimation.

4. The transmitter of claim 3, wherein the data block incudes a further reference signal, the further reference signal used for synchronizing the receiver with the pulse shaped transmission system.

5. A wireless communication network, comprising:
a transmitter, comprising:
 a pulse shaping filter configured to pulse shape filter an Inverse Fast Fourier Transformation, IFFT, processed data block to generate a transmit signal comprising data to be transmitted to a receiver of a multi carrier pulse shaped transmission system; and
 an inverse pulse shaping filter configured to inverse pulse shape filter a predefined signal pattern,
 wherein the transmitter is configured to include the inverse filtered signal pattern into the IFFT processed data block prior to applying the IFFT processed data block to the pulse shaping filter so that after the pulse shaping filter the non-pulse-shaped signal pattern appears again in the transmit signal.

6. The transmitter of claim 1, wherein
the predefined signal pattern comprises pilot symbols,
the transmitter comprises an Inverse Fast Fourier Transformation, IFFT, filter receiving the data block and the pilot symbols, the IFFT filter generating the IFFT processed data block and IFFT processed pilot symbols,
the inverse pulse shaping filter receives the IFFT processed pilot symbols and generates convolved pilot symbols,
the transmitter comprises an inserter for inserting the convolved pilot symbols into the IFFT processed data block, and
the pulse shaping filter pulse shape filters the IFFT processed data block and the convolved pilot symbols.

7. The wireless communication network of claim 5, wherein the wireless communication network uses a FBMC transmission scheme, a GFDM transmission scheme or another OFDM based pulse shaped transmission scheme.

8. A method, comprising:
providing, by a transmitter of a multi carrier pulse shaped transmission system, a pulse shaped transmit signal including a data block to be transmitted to a receiver of the multi carrier pulse shaped transmission system;
wherein providing the pulse shaped transmit signal including the data block comprises:
 Inverse Fast Fourier Transformation, IFFT, processing the data block;
 pulse shape filtering the IFFT processed data block to generate the pulse shaped transmit signal comprising data to be transmitted to the receiver of the multi carrier pulse shaped transmission system;
 inverse pulse shape filtering a predefined signal pattern, and including the inverse filtered signal pattern into the IFFT processed data block prior to pulse shape filtering the IFFT processed data block so that after the pulse shaping filter the non-pulse-shaped signal pattern appears again in the transmit signal.

9. A method, comprising:
providing, by a transmitter of a multi carrier pulse shaped transmission system, a pulse shaped transmit signal including a data block to be transmitted to a receiver of the multi carrier pulse shaped transmission system,
wherein providing the pulse shaped transmit signal including the data block comprises:
 Inverse Fast Fourier Transformation, IFFT, processing the data block,
 pulse shape filtering the IFFT processed data block to generate a pulse shaped transmit signal comprising data to be transmitted to the receiver of the multi carrier pulse shaped transmission system, and
 inverse pulse shape filtering a predefined signal pattern, and including the inverse filtered signal pattern into the IFFT processed data block prior to pulse shape filtering the IFFT processed data block so that after the pulse shaping filter the non-pulse-shaped signal pattern appears again in the transmit signal;
transmitting the pulse shaped transmit signal from the transmitter to a receiver of the multi carrier pulse shaped transmission system;
retrieving, at the receiver, the predefined signal pattern from the pulse shaped transmit signal; and
following the retrieval of predefined signal pattern from the pulse shaped transmit signal, pulse shape filtering the pulse shaped transmit signal to acquire data for the receiver.

10. A non-transitory digital storage medium having stored thereon a computer program for performing a method, comprising:
providing, by a transmitter of a multi carrier pulse shaped transmission system, a pulse shaped transmit signal including a data block to be transmitted to a receiver of the multi carrier pulse shaped transmission system;
wherein providing the pulse shaped transmit signal including the data block comprises:
 Inverse Fast Fourier Transformation, IFFT, processing the data block,
 pulse shape filtering the IFFT processed data block to generate the transmit signal comprising data to be transmitted to the receiver of the multi carrier pulse shaped transmission system; and
 inverse pulse shape filtering a predefined signal pattern, and including the inverse filtered signal pattern into the IFFT processed data block prior to pulse shape filtering the IFFT processed data block so that after the pulse shaping filter the non-pulse-shaped signal pattern appears again in the transmit signal,
when said computer program is run by a computer.

11. A non-transitory digital storage medium having stored thereon a computer program for performing a method, comprising:
providing, by a transmitter of a multi carrier pulse shaped transmission system, a pulse shaped transmit signal including a data block to be transmitted to a receiver of the multi carrier pulse shaped transmission system,
wherein providing the pulse shaped transmit signal including the data block comprises:
 Inverse Fast Fourier Transformation, IFFT, processing the data block,
 pulse shape filtering the IFFT processed data block to generate a pulse shaped transmit signal comprising data to be transmitted to the receiver of the multi carrier pulse shaped transmission system, and
 inverse pulse shape filtering a predefined signal pattern, and including the inverse filtered signal pattern into the IFFT processed data block prior to pulse shape filtering the IFFT processed data block so that after the pulse shaping filter the non-pulse-shaped signal pattern appears again in the transmit signal;
transmitting the pulse shaped transmit signal from the transmitter to a receiver of the multi carrier pulse shaped transmission system;
retrieving, at the receiver, the predefined signal pattern from the pulse shaped transmit signal; and following the retrieval of predefined signal pattern from the pulse shaped transmit signal, pulse shape filtering the pulse shaped transmit signal to acquire data for the receiver,
when said computer program is run by a computer.

\* \* \* \* \*